United States Patent [19]
McIntyre et al.

[11] Patent Number: 5,940,641
[45] Date of Patent: Aug. 17, 1999

[54] EXTENDING PANORAMIC IMAGES

[75] Inventors: Dale F. McIntyre, Honeoye Falls; Loretta E. Allen, Hilton, both of N.Y.

[73] Assignee: Eastman Kodak Company, Rochester, N.Y.

[21] Appl. No.: 08/891,190

[22] Filed: Jul. 10, 1997

[51] Int. Cl.$^6$ ................................................. G03B 41/00
[52] U.S. Cl. ........................ 396/332; 396/326; 396/333; 396/429
[58] Field of Search .................................. 396/322, 323, 396/332, 333, 334, 324, 326, 327, 429

[56] References Cited

U.S. PATENT DOCUMENTS

| | | | |
|---|---|---|---|
| 2,725,804 | 12/1955 | Herzfeld | 396/323 |
| 3,115,816 | 12/1963 | Muller | 396/326 X |
| 4,903,069 | 2/1990 | Lam | 396/326 X |
| 5,130,745 | 7/1992 | Cloutier et al. | |

*Primary Examiner*—Howard B. Blankenship
*Attorney, Agent, or Firm*—Raymond L. Owens

[57] ABSTRACT

In a method of making a single image of a scene which is the combined images of different portions of the scene, including providing first and second image capturing structures with the second image capturing structure including a moveable lens; and moving the second lens so that it captures at least one different portion of the scene but which overlaps with a first portion of the scene captured by the first image capture structure, the second image capture structure including an image sensor. The method further determines when the second lens moves across the scene to a desired position and stopping the second lens at the desired position for causing the first and second capture structure to capture overlapping images of different portions of the scene.

5 Claims, 9 Drawing Sheets

EXTENDING PANORAMIC IMAGES

CROSS REFERENCE TO RELATED APPLICATIONS

The present invention is related to U.S. patent application Ser. No. 08/672,390 filed May 29, 1996, entitled "A Camera for Recording Images on a Photographic Film or on a Magnetic Tape", to Dale F. McIntyre et al, and U.S. patent application Ser. No. 08/637,116 filed Apr. 24, 1996, entitled "A Non-Photographic Strip Having a Base Layer Similar to a Photographic Filmstrip and a Magnetic Recording Layer", to Dale F. McIntyre et al assigned to the assignee of the present invention. The disclosure of this related application is incorporated herein by reference.

FIELD OF THE INVENTION

The present invention relates to a method of making extended panoramic images, the size of which can be adjusted.

BACKGROUND OF THE INVENTION

It is well known that a camera can be operated in a panoramic mode and produce an exposure on film. The film is then printed with an enlargement ratio of approximately two times so as to obtain panoramic effect. More particularly, at the film gate of the camera when a panoramic view is desired, the top and bottom portions of the film portions are masked. Alternatively, a full image can be photographed but during printing, only the central region of the exposed film is printed and enlarged to obtain a panoramic effect. The problem with these arrangements is that the field of view is restricted and can, typically, only be changed with a zoom lens. Even in that case, for a given focal length, there is no increase in the field of view.

SUMMARY OF THE INVENTION

It is an object of the present invention to provide a camera in which the field of view can be extended without resorting to use of zooms.

This object is achieved in a method of making a single image of a scene which is the combined images of different portions of the scene, comprising the steps of:

a) providing first and second image capturing means with the second image capturing means including a moveable lens;

b) moving the second lens so that it captures at least one different portion of the scene but which overlaps with a first portion of the scene captured by the first image capture means, the second image capture means including an image sensor;

c) determining when the second lens moves across the scene to a desired position; and d) stopping the second lens at the desired position for causing the first and second capture means to capture overlapping images of different portions of the scene.

ADVANTAGES

In accordance with the present invention, by making one of the capture means moveable, the field of view of the camera can be widened or shortened horizontally so as to more effectively provide for extended panoramic picture taking.

DETAILED DESCRIPTION OF THE INVENTION

Figure 1A:
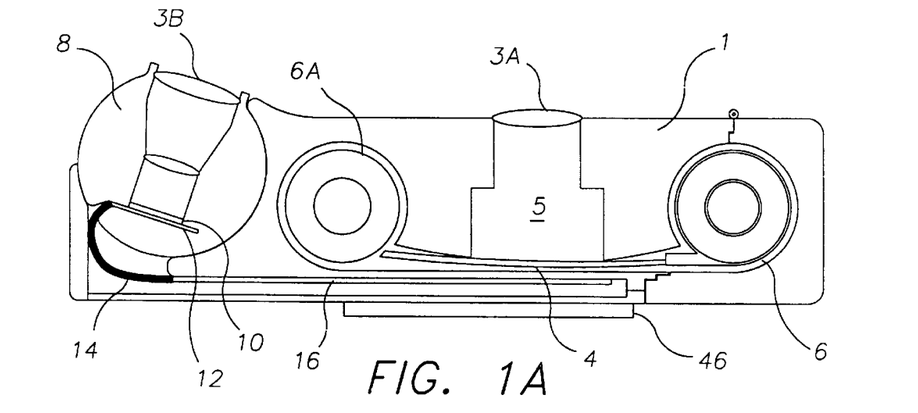
FIGS. 1A, 1B, and 1C are top views of a hybrid dual lens panoramic camera in accordance with the present invention wherein the figures show different positions of the second capture lens as it captures different portions of the scene.

The term hybrid dual lens extended panoramic camera refers to an image capturing device such as a camera that utilizes at least two separate imaging capture media such as photographic film 4 and an image sensor 10 or two separate image sensors to capture a scene. Turning now to FIG. 1A, there is shown a hybrid dual lens extended panoramic camera having a hybrid camera main body 1; and image capturing structures which respectively include imaging lenses 3A and 3B. The imaging capturing lens 3A is fixed and focuses an image of a subject onto a film plane at a film exposure gate 5. At the film exposure gate 5, there is disposed a photographic film 4. The photographic film 4 is disposed in a standard photographic cartridge 6. The photographic film 4 can be advanced across the film exposure gate 5 and into a take-up spool 6A. A display device 46 is shown at the rear of the camera to permit a viewer to view the scene before the image is captured. These components are the same as those in a normal camera.

The lens 3B is mounted in a moveable assembly 8. The assembly 8 is pivoted and moveable across a range of angular positions across a fixed horizontal plane. The assembly 8 includes a motor (not shown) which is under the control of microprocessor 48 shown in FIG. 3. The rotation of the motor (which rotates the assembly 8) is caused by signals from the microprocessor 48. The microprocessor 48 also causes the assembly 8 to stop the assembly at the desired position to capture overlapping portions of the scene (see FIGS. 5A–C). The range of movement of the assembly 8 can be in either direction towards or away from the lens 3A. Further, the assembly 8 contains an image sensor 10 which is mounted on a circuit board 12. The circuit board 12 is connected to a control board 16 via cable 14. The control board 16 includes various electronic components which are shown in more detail in FIG. 3. Moreover, the operation of the image sensor 10 will be discussed more fully in connection with FIG. 3.

Figure 1B:
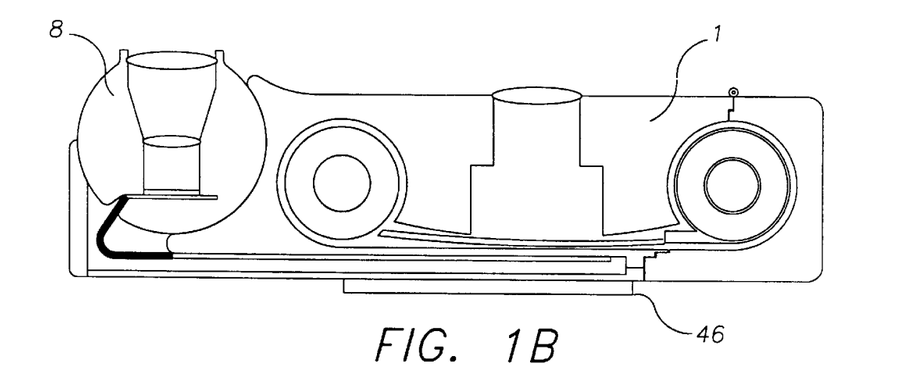
Figure 1C:
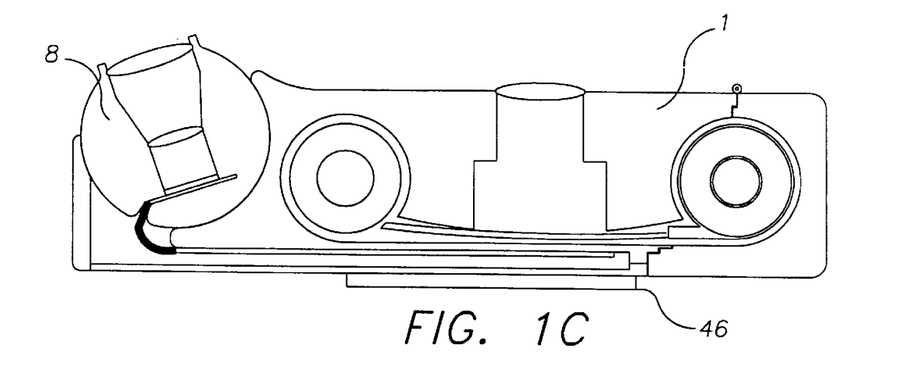

FIGS. 1A, 1B, and 1C are the same with the exception that the assembly 8 is moved to different positions in the manner shown. Briefly, reference should be made to FIGS. 5A, 5B, and 5C which show how the various positions of the assembly 8 correspond to different overlapping extended panoramic views.

Figure 5A:
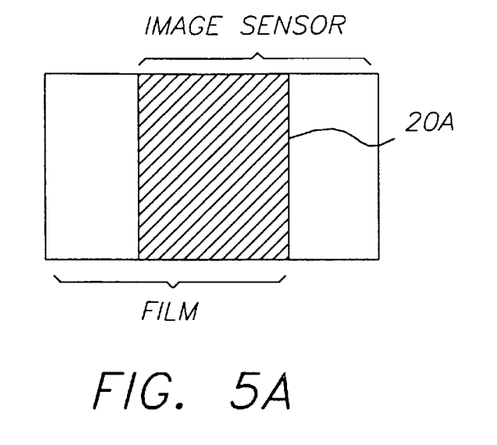
FIGS. 5A, 5B, and 5C are schematic representations showing the overlap of the photographic and electronic images which can be achieved by the hybrid dual lens extended panoramic camera in the different positions of the second capture lens shown in FIGS. 1A, 1B, and 1C.
Figure 5B:
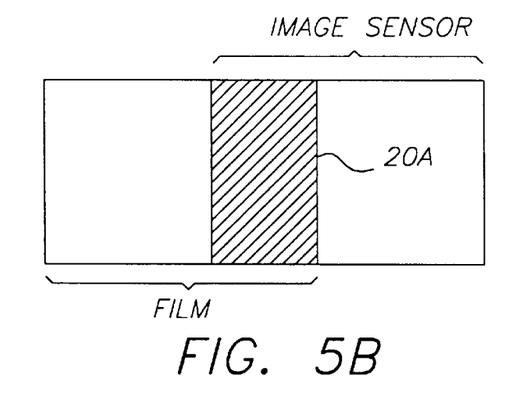
Figure 5C:
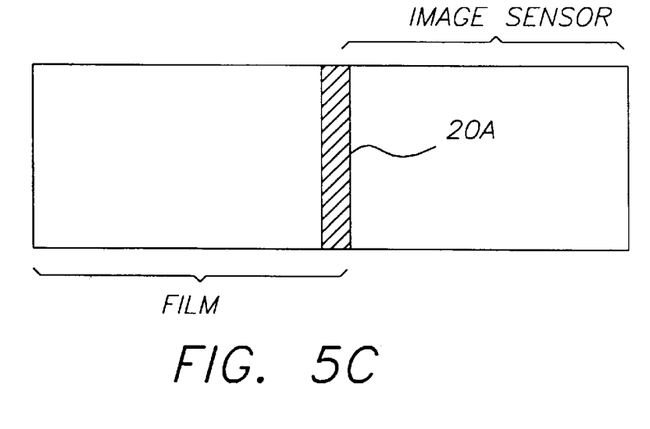

FIG. 5A shows an overlapping portion of 20A of the scene which is captured by both the photographic film 4 and the image sensor 10. This corresponds to the position of lenses 3A and 3B in FIG. 1A. FIGS. 5B and 5C are similar to FIG. 5A, but they correspond to the position of the lenses 3A and 3B in FIGS. 1B and 1C, respectively.

As is well known in the art, the substrate of the photographic film 4 can have coated on its rear side, a transparent magnetic layer. Magnetic head 38 and linear magnetic head 36 (see FIGS. 2 and 3), which are under the control of head interface electronics 40, can be used to read and write information to the transparent magnetic storage layer. The head interface electronics 40 provides signals to linear magnetic head array 36 and magnetic head 38 in a conventional manner. Although two separate arrangements will be described for the linear magnetic head array 36 and the magnetic head 38, those skilled in the art will appreciate that a single magnetic head unit can be used to provide the functions of these heads. Magnetic head 38 includes two coils (not shown) which correspond to two tracks (also not shown) on the photographic film 4. For a more complete disclosure see, for example, commonly assigned U.S. Pat. No. 5,130,745, the disclosure of which is incorporated by reference.

As is well understood, a cartridge receiving structure 31 is provided within the hybrid camera main body 1 and, in accordance with the present invention, can receive a cartridge 6 which has either photographic film or magnetic tape.

In accordance with the present invention, images are taken simultaneously on two different media: photographic film 4 and image sensor 10. It will be understood, however, that the two separate media can indeed be the same so you could actually use two separate photographic films or two separate image sensors. Although these two images are of the same scene, they are taken from different positions, and as will be described later, can be used in generating an extended panoramic image. Typically, the photographic image, which will be digitized, has a higher scene spatial resolution than that of the image sensor 10. These two images are then digitally processed to provide a single extended panoramic image in a conventional process such as embodied in the commercially available software from Apple Computer known as Quick Time Virtual Reality (QTVR).

Figure 2:
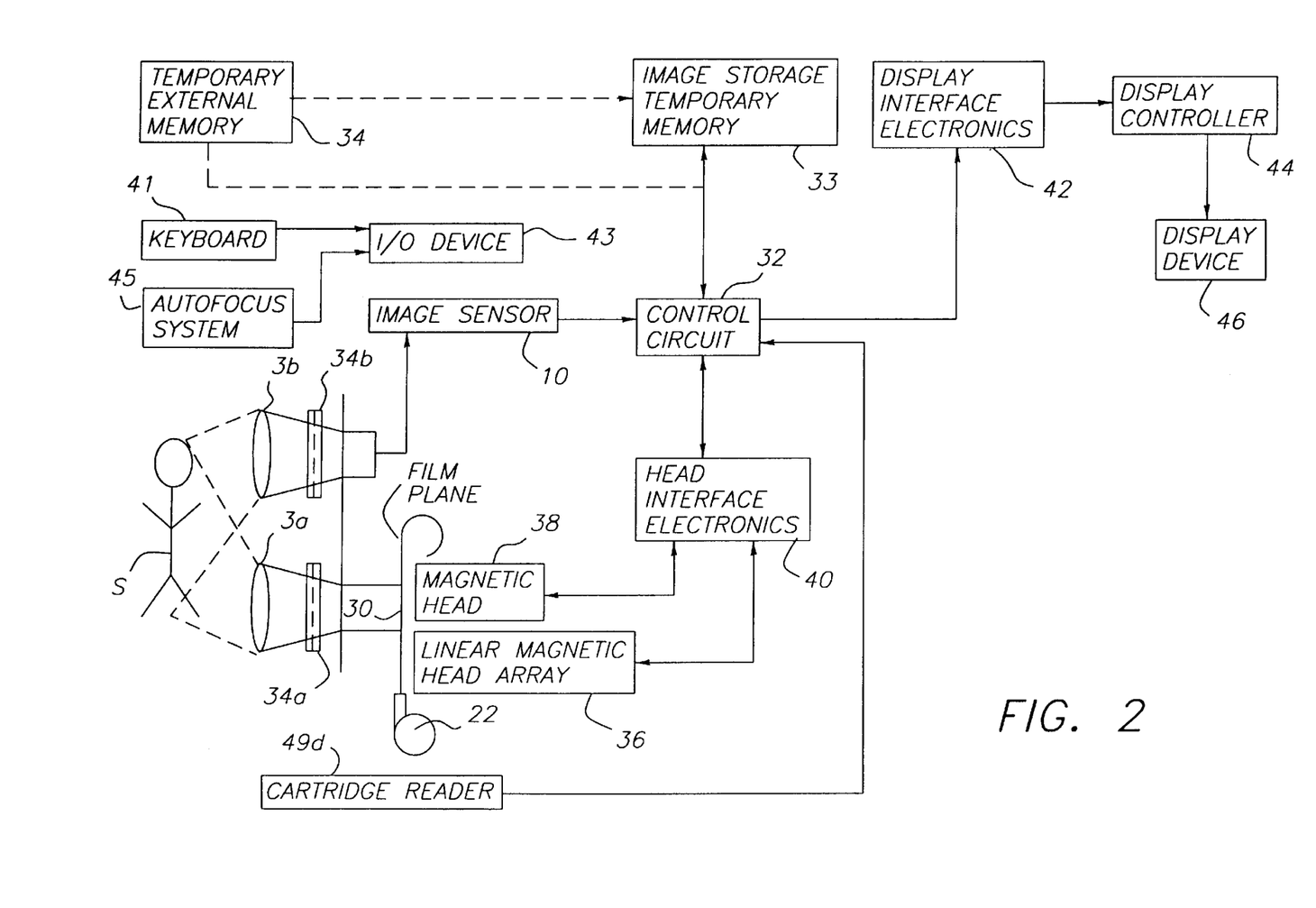
FIG. 2 is a block diagram of various elements of the hybrid camera system shown in FIGS. 1A, 1B, and 1C.
Figure 3:
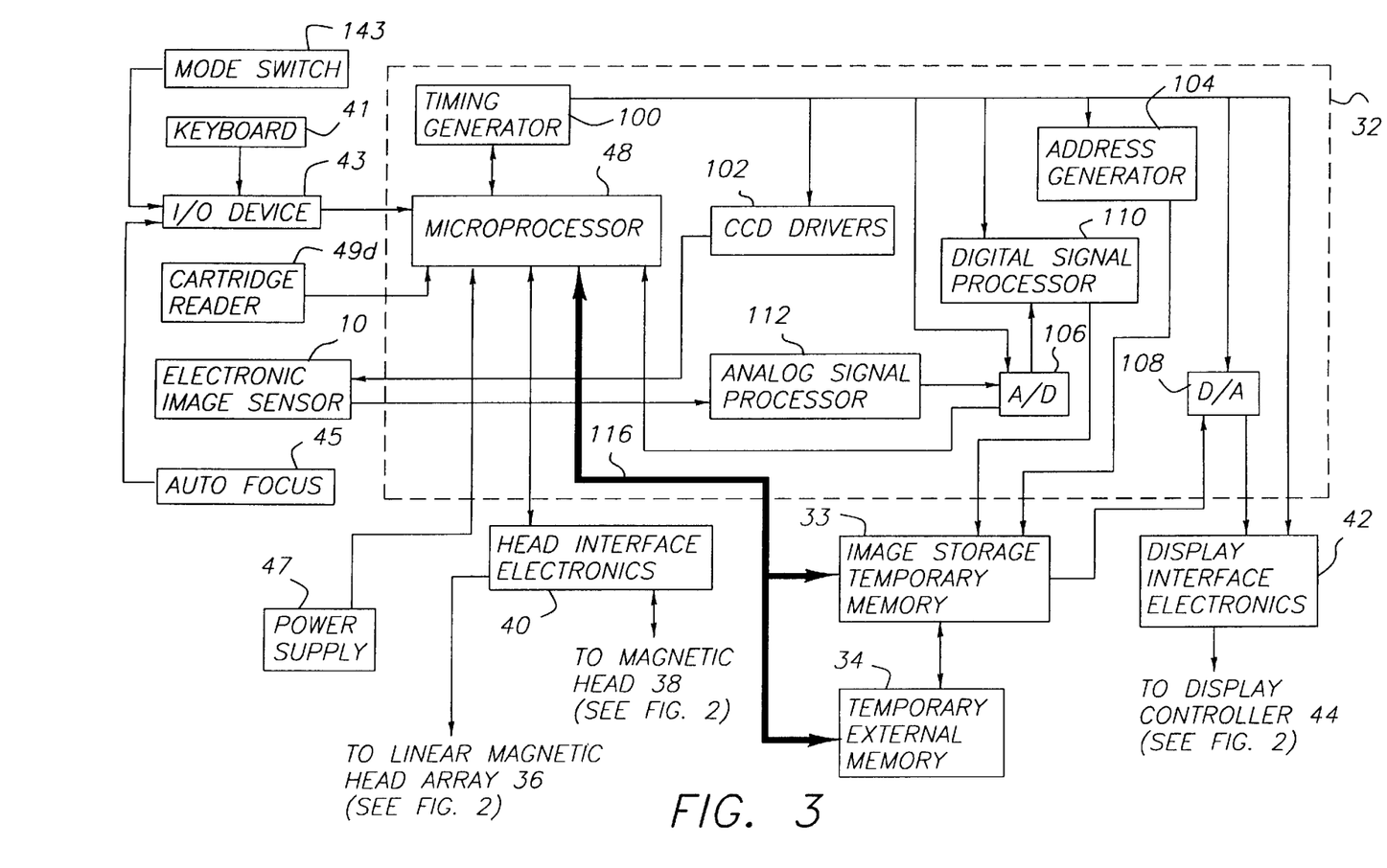
FIG. 3 is a block diagram of the control circuit for the hybrid dual lens extended panoramic camera of FIG. 1.

In FIG. 2, a block diagram is shown of various systems within the hybrid camera main body 1. As shown, a subject S is positioned in front of the camera lenses 3A and 3B. After the distance to the subject S has been determined by a conventional autofocus system 45, an image of the subject S is focused by the camera lens 3A onto the photographic film 4 supplied by film cartridge 6 which contains either photographic film or magnetic tape. Using the previously determined distance to subject S described above, an image of the subject S is also focused by the camera lens 3B and other optical elements (not shown) upon the image sensor 10. Image sensor 10 can be a full frame charge coupled device (CCD) or, alternatively, can be an interline device with, for example, photodiode pixels which are adapted to deliver charge to interline CCDs. Conventional electronic circuitry (not shown) is associated with the image sensor 10. After the image sensor 10 receives light representative of the image of the subject S, the circuitry sets up, acquires, and transfers electronic signals from the image sensor 10 to circuitry for digitization and image processing for forming the extended panoramic image. Such electronics are well known in the art and their description has been omitted for clarity of discussion. A control circuit 32 is adapted to transfer images from an image storage temporary memory 33 to display interface electronics 42. The display interface electronics 42 causes digital images to be delivered to a display controller 44 which, in turn, causes selected images to be shown on a display device 46. The display device 46 can, for example, be a liquid crystal display device. It will be understood that the image shown on a display device is not a panoramic image since it is not a combination of two digitized images. In operation, the image on the display first displays the captured image by the image sensor 10. After this image is viewed, a viewer then can make the decision as to whether a panoramic image is desirable. At that point since both images have been recorded, they then can be processed as discussed later in this disclosure. When the image storage temporary memory 33 is fully loaded, the control circuit 32 signals to the display interface electronics 42 an appropriate signal causing the display controller 44 to display information on the display device 46 indicating to the user that the image storage temporary memory 33 is full. The user then, via the keyboard 41, makes a decision whether to transfer the images in the display interface electronics 42 or to rewind the film cartridge 6 and insert a film cartridge 6 containing magnetic tape. The arrangement of such type of a display structure is well known in the art and used on many commercially available cameras such as the Kodak DC-25 digital still camera. In operation, shutter mechanisms 34A and 34B (shown schematically as dotted lines) of the hybrid camera are simultaneously operated and images of the subject S are directed to the photographic film plane 30 for recording on the photographic film 4 and onto the image sensor 10. The operation of the shutters is as best shown in FIG. 3 under the control of an input/output device 43 such that when a magnetic cartridge is loaded into the camera, the shutter mechanism 34A is disabled and prevents light from the subject from illuminating the photographic film plane.

The camera can be operated in two modes of operation. The mode switch 143, shown in FIG. 3, provides this function. In operation, in a first mode, the lens 3A captures a single image of the scene by the first image capture structure onto photographic film 4 and in a second mode of operation moves the second lens 3B so that it substantially simultaneously captures at least one different portion of the scene which overlaps with a first portion of the scene captured by the lens 3A. This image capture has been shown in FIG. 5A–5C discussed above. It will be understood to those skilled in the art that the arrangement described can be used to capture one film image and two or more successive electronic images thereby providing a further extended panoramic image. Moreover, those skilled in the art will appreciate that a single film image has a higher resolution than electronic images, therefore two electronic images can be used with a single film image to provide an increased resolution extended panoramic image. The electronic images can be processed into a single improved electronic image in a manner disclosed in commonly assigned U.S. patent application Ser. No. 08/796,350 filed Feb. 7, 1997, the disclosure of which is hereby incorporated by reference. The improved electronic image is then combined with the film image to form a single higher resolution extended panoramic image using software such as Apple Computer's QTVR.

The image storage temporary memory 33 may include transistors that can store a number of images as is well known to those skilled in the art. Each time an image is to be photographed on the film, a corresponding image or selectively rotated image is stored in image storage temporary memory 33. Another temporary external memory 34 is shown which is external to the camera itself and can either receive or deliver signals directly under the control of the control circuit 32. Of course, the images stored in image storage temporary memory 33 and the photographic images which will be digitized will be used to produce the extended panoramic image.

The linear magnetic head array 36 is under the control of the head interface electronics 40. In accordance with the present invention, after a film cartridge 6 having a magnetic tape is inserted into the camera, the magnetic head 38 detects the presence of a film cartridge 6 having magnetic tape and provides a signal to the head interface electronics 40 that a magnetic tape is now in the camera. Under the control of a user, the keyboard 41 is mounted on the camera body but not shown in FIG. 1 sends signals through input/output device 43 into control circuit 32 which causes data representing images to be selectively transferred to the head interface electronics 40 which, in turn, control the writing of such image data via the linear magnetic head array 36.

More particularly, the keyboard 41 signals the control circuit 32 to transfer selected images from the image storage temporary memory 33 through the control circuit 32 and the head interface electronics 40 to the linear magnetic head array 36. The linear magnetic head array 36 records such images onto magnetic tape in a high speed linearly parallel manner.

The output of the hybrid camera main body 1 is photographic film images and images of the same scenes captured at different positions by the image sensor 10 and subsequently recorded onto magnetic tape. These two media are then used to produce extended panoramic images. More particularly, corresponding images from the magnetic tape and digitized images from the photographic film are combined and processed as will be described later.

Turning now to FIG. 3, where a more detailed block diagram is shown of control circuit 32. The control circuit 32 is shown to receive inputs from input/output device 43, which is under the control of keyboard 41. Also shown external to the control circuit 32 are the head interface electronics 40, temporary external memory 34, and display interface electronics 42, all previously discussed with reference to FIG. 2. Moreover, a power supply 47 is shown to provide power to a microprocessor 48. The microprocessor 48 receives an input from the input/output device 43 and provides control signals to a timing generator 100. The timing generator 100 controls CCD drivers 102, an address generator 104, signal processing circuitry 110, and also provides signals to an analog-to-digital converter 106 and to display interface electronics 42, as well as to a digital-to-analog converter 108. The CCD drivers control the image sensor 10 which, in turn, provides analog signals to analog signal processing circuitry 112. The analog signal processing circuitry 112 delivers signals to the analog-to-digital converter 106 which delivers digital signals to digital signal processing circuitry 110. The digital signal processing circuitry 110 provides an input to image storage temporary memory 33. The address generator 104 causes digital information to be delivered either to the temporary external memory 34 or to the digital-to-analog converter 108. The digital-to-analog converter 108, under the control of the timing generator 100, provides input signals to the display interface electronics 42. In response to signals from timing generator 100, the display interface electronics 42 delivers non-panoramic image signals to the display interface electronics 42 shown in FIG. 2.

The details of photographic film 4 and the magnetic recording layer thereon are fully described in aforementioned U.S. Pat. No. 5,130,745, the disclosure of which is incorporated herein by reference. For a more complete disclosure of the operation of magnetic head 38, see commonly assigned U.S. Pat. No. 5,450,149 issued Sep. 12, 1995 to Cocca entitled "Photographic Camera and Method for Recording Magnetic Data on Film", the disclosure which is incorporated herein by reference. For a more complete description of the magnetic tape, which can be used in the present invention for the recording of the image data resulting from the actuation of the second image capture structure, see the above-identified commonly assigned U.S. patent application Ser. No. 08/672,390 filed May 29, 1996. It will be understood to include a high density ferromagnetic structure such as found in conventional video or audio tape cassettes. For an example of such a structure, see commonly assigned U.S. Pat. application Ser. No. 08/637,116, filed Apr. 24, 1996.

Figure 4A:
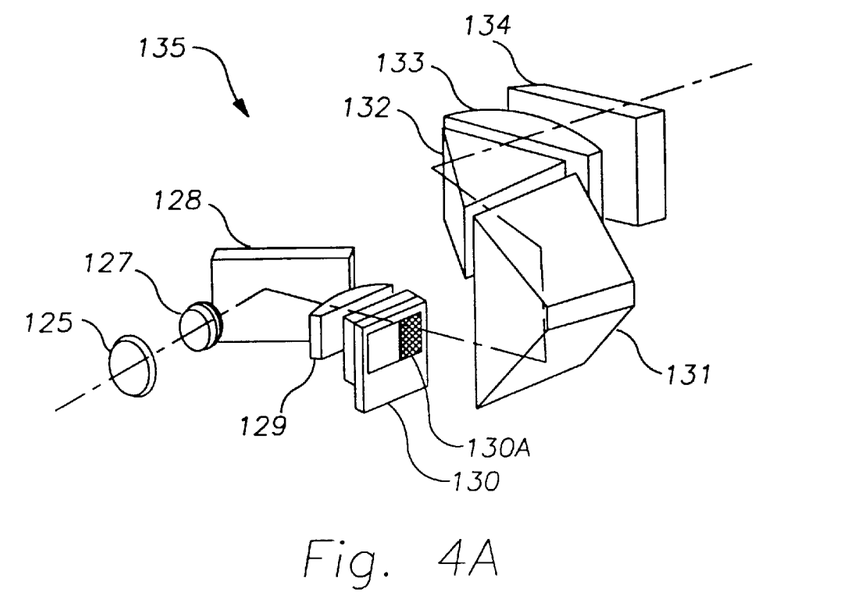
FIGS. 4A & 4B are exploded views of a viewfinder containing an LCD mask wherein in FIG. 4A a standard image is to be formed on film and in FIG. 4B an extended panoramic image is to be formed.
Figure 4B:
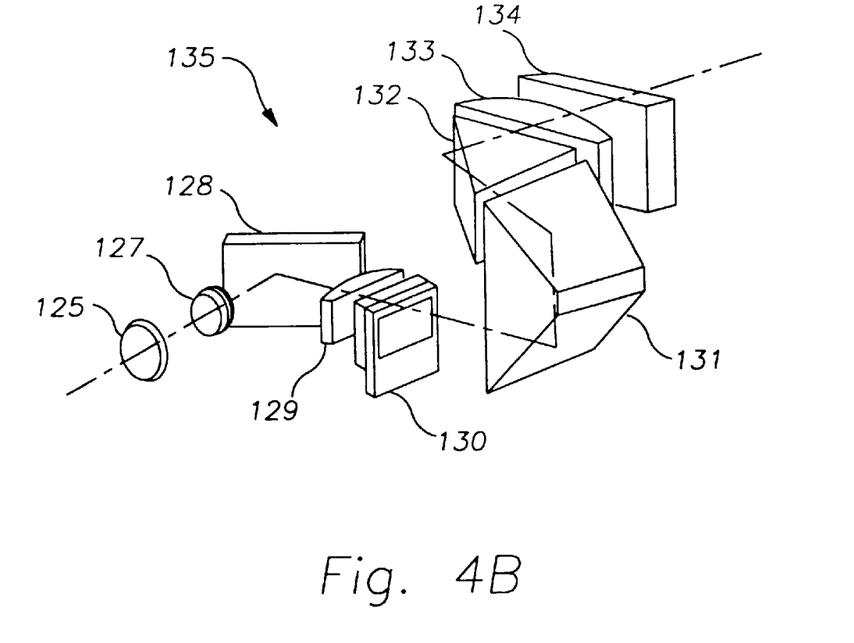

Turning now to FIGS. 4A & 4B, a representative viewfinder 135 is shown which can be used in accordance with the present invention. FIG. 4A depicts the normal mode of operation which includes the constraining field of view of the Advanced Photographic System whereas FIG. 4B depicts the "Extended" mode of operation in accordance with the present invention. The viewfinder 135 includes objective lenses 125, 126, and 127; a reflecting mirror 128; a field lens 129; a TN-type imaging field changing liquid crystal display (LCD) 130 for performing image field changing; optical prisms 131 and 132 for obtaining an erecting image; and eye piece 133; and an eye protective glass plate 134. The cross-hatch portion of the 130A of the LCD 130 is a portion of the mask for the LCD 130 which is used when a standard image is to be made. When an extended panoramic image is to be made, the LCD 130 is as shown in FIG. 4B. In the arrangement of FIG. 4B, when the mode switch 143 (see FIG. 3) is selectively moved to the "EXTENDED" position, the display state of the imaging field changes LCD 130 as discussed above (see FIGS. 5A–5C). For example, the viewfinder 135 can be made to correspond to three different fields of view which correspond to the images shown in FIGS. 5A–5C. It will be understood that when the camera is operating in a regular mode (not extended panoramic), the viewfinder can also cycle through a series of image sizes corresponding to standard image sizes such as provided by the advanced photographic system which is commercially available. In operation, the mode switch 143 selectively engages the "Extended" position causing a "extended" signal to be delivered to microprocessor 48 via I/O device 43. The I/O device 43 responds to inputs on the keyboard 41 and the autofocus system 45. The logical operation of this sequence is fully described with respect to FIG. 6.

Figure 6:
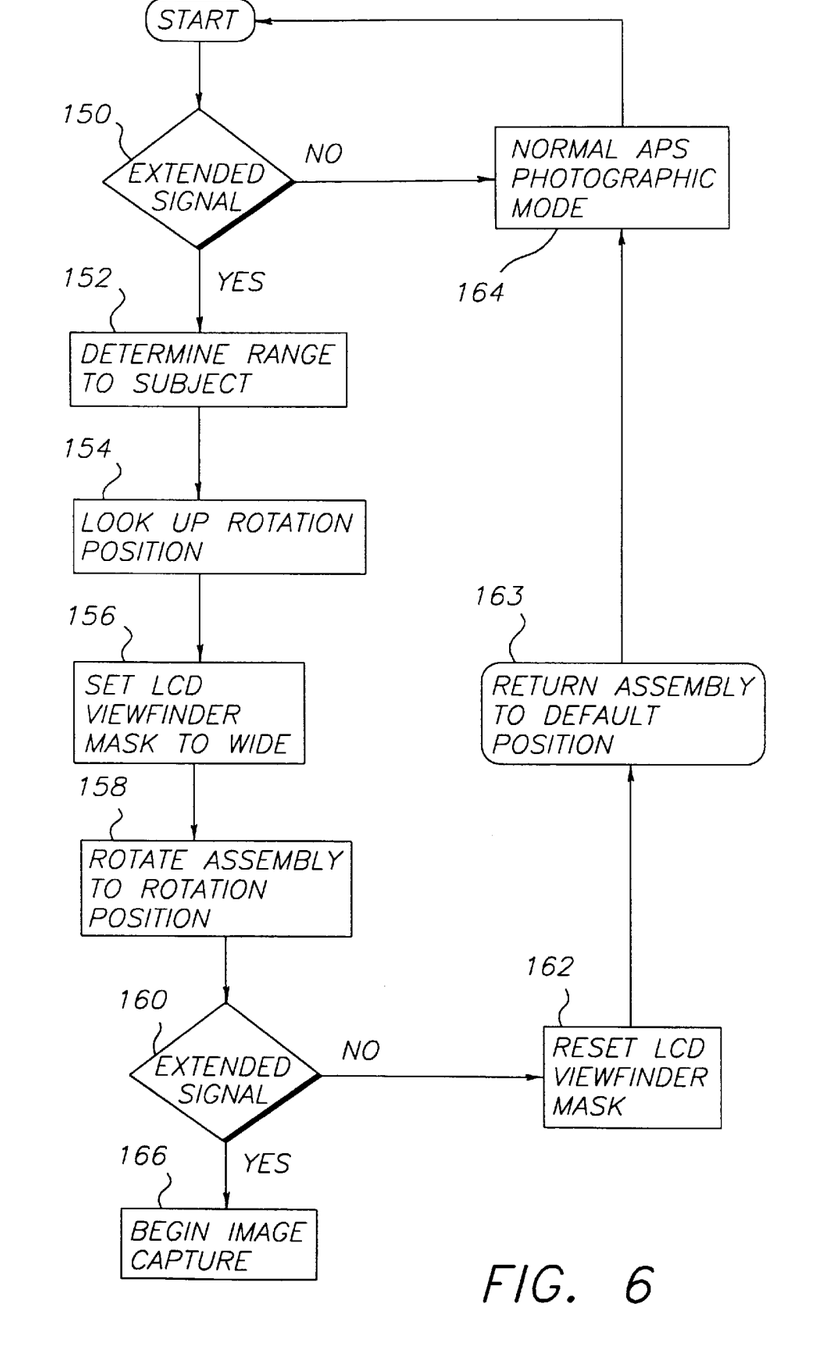
FIG. 6 is a flow chart showing in block diagram form the steps needed for the rotation of the second capture structure when the extended panoramic mode of operation is selected.

Turning now to FIG. 6, software resident in the camera and executed by microprocessor 48 (see FIG. 3) continuously polls a number of 1/0 switch functions accessible to a user once the camera has been powered on. One of the switch functions is the "EXTENDED" position of the mode selection switch 143. In decision block 150, the signal from the switch 143 indicating an "EXTENDED" mode has been selected is queried. If the "EXTENDED" signal isn't TRUE, then the camera behaves in the normal single image format selection mode [which can be, according to Kodak's Advanced Photographic System (APS)] with the additional electronic image capture structure including image sensor 10 capturing substantially the same scene as captured on photographic film 4. However if the "EXTENDED" signal is TRUE, the process to capture an extended panoramic image begins. The first step in this process is the determination of the range to the subject in Block 152. To maximize the coverage of the extended panoramic image, it is desirable to minimize the overlap 20A of the two image capture structures. For example, to maintain a 5%–10% image overlap for a given field angle of lens 3A and lens 3B, assembly 8 must be rotated left only 18 degrees if the subject is 1.5 feet from the camera (see Table 1 and FIGS. 7, 8, and 9).

TABLE 1

| FIG. | Subject Distance | Rotation (degrees) | % Overlap |
|---|---|---|---|
| 7 | 1'5"–2'0" | 18 | 8–13 |
| 8 | 2'0"–2'6" | 20 | 9–13 |
| 9 | 2'6"–3'7" | 22 | 7–13 |

Figure 7:
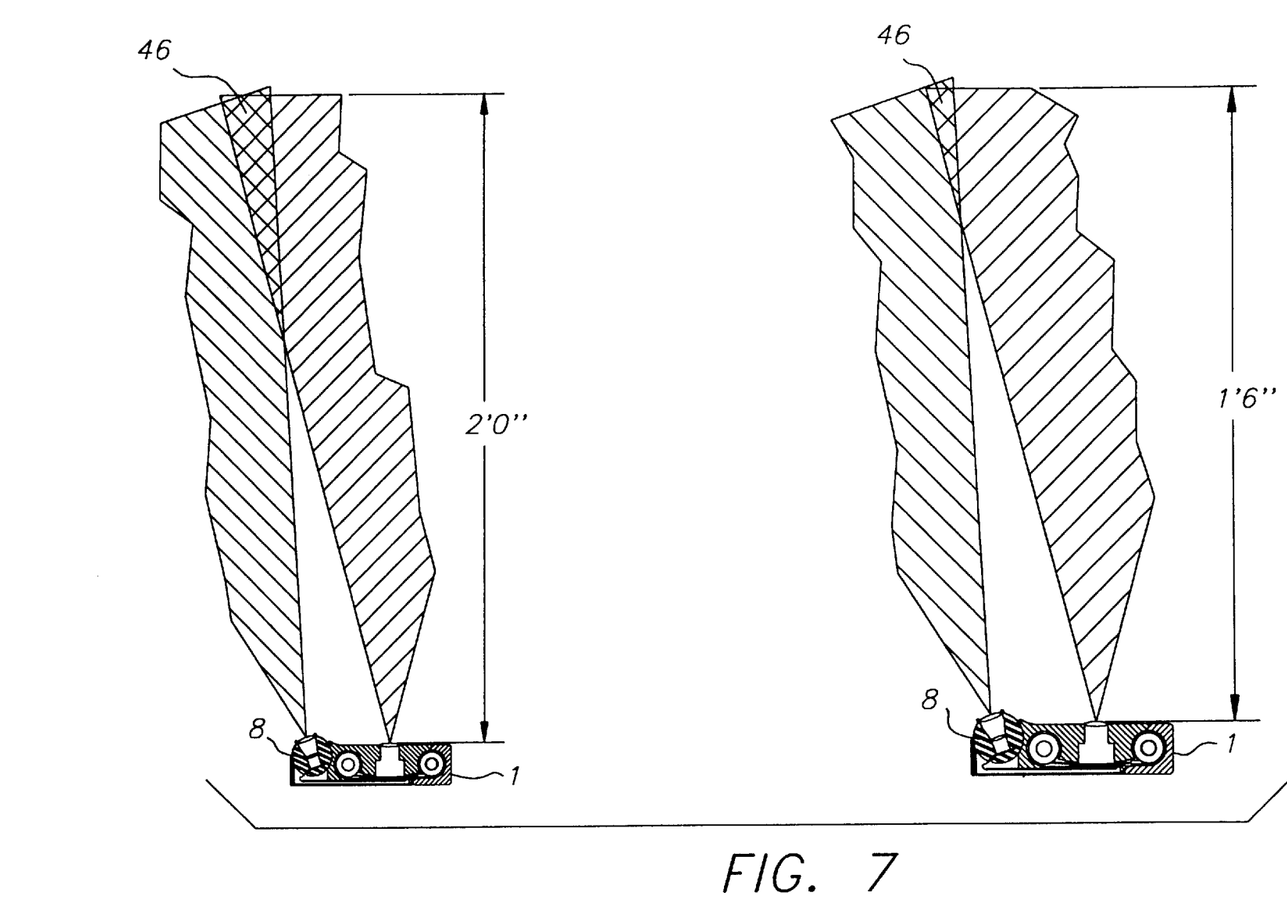
FIGS. 7, 8, and 9 are perspective top views showing the field of views of the two image capture structures in the extended panoramic mode where the subject is at different distances from the camera
Figure 8:
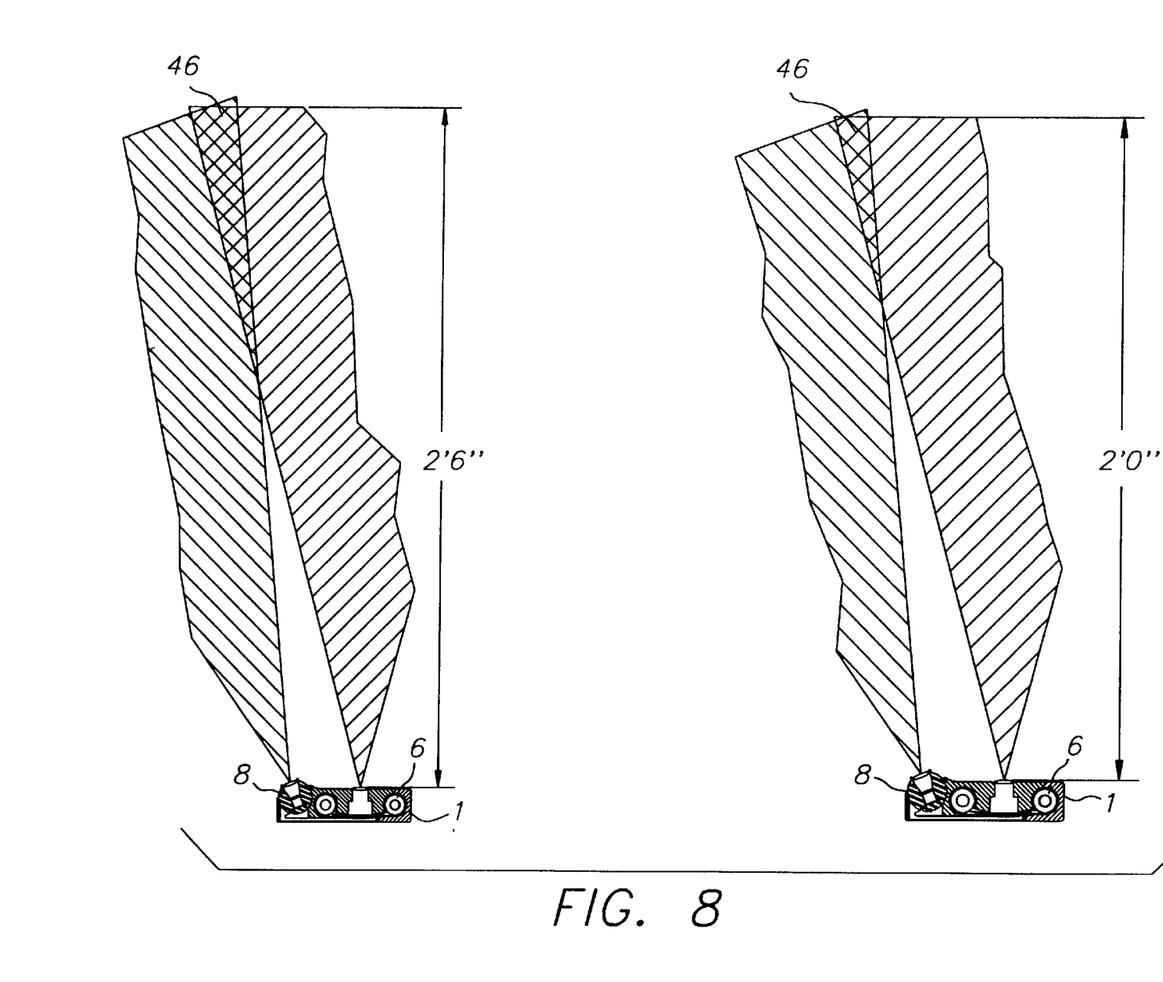
Figure 9:
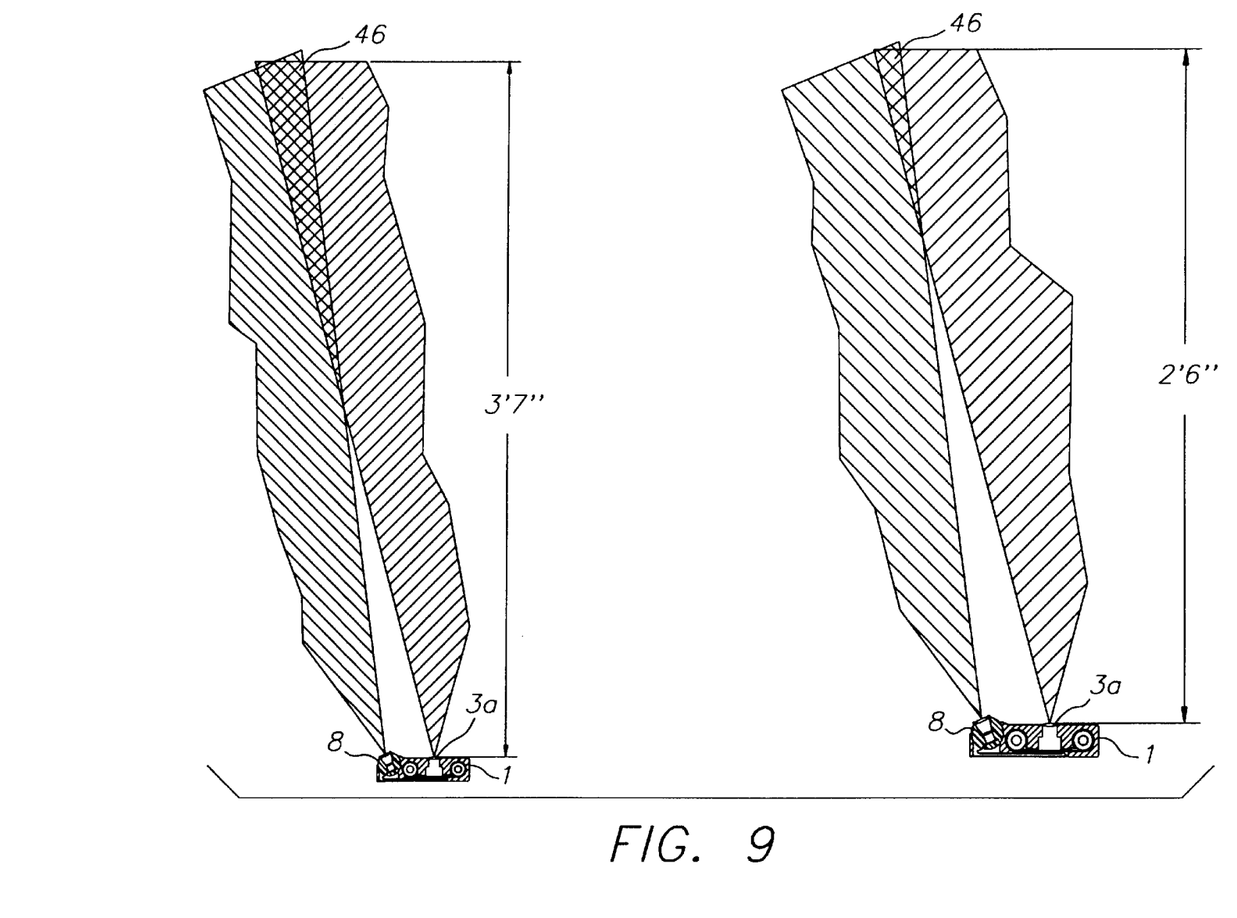

FIG. 7 is a perspective top view showing the field of views of the two image capture structures in the extended panoramic mode which correspond to the arrangement shown in FIG. 5C. FIGS. 8 and 9 show arrangements similar to FIG. 7 but with different distances of the subject from the camera. For example, in FIG. 7, the subject can be 1.5 feet from the camera and in FIG. 8, the distance is 4 feet. In FIG. 9, the subject is at infinity.

In general, the rotation as a function of subject distance is a continuous function but practical design limitations of the viewfinder masking operation and rotation of assembly 8 dictate that microprocessor 48 use a lookup table represented by TABLE 1. The microprocessor 48 manipulates these adjustments in a defined discrete manner as indicated by Blocks 154, 156 and 158. As shown in FIG. 2, the control circuit 32 provides signals to the rotatable assembly 8 and causing the movement of the lens 3b so that it captures different positions of the scene on the image sensor. The assembly 8 will be understood to include a conventional motor arrangement responsive to the control circuit. The control circuit 32 also stops movement of the assembly 8 so that the lens 3b at the desired position and for causing the first and second capture means to capture overlapping images of different portions of the scene. Of course, such a technique implies that the overlap area is now a variable percentage equal to or greater than 5%. Before executing the expanded image capture in Block 166, the status of the "EXTENDED" signal is ascertained again. If it is NOT TRUE, then Block 162 resets the viewfinder mask 130A of LCD 130 followed by rotating assembly 8 back to its default position where the field of view of the two image capture structures is substantially coincident.

The invention has been described in detail with particular reference to certain preferred embodiments thereof, but it will be understood that variations and modifications can be effected within the spirit and scope of the invention.

| PARTS LIST | |
|---|---|
| S | subject |
| 1 | camera main body |
| 3A | imaging lens |
| 3B | imaging lens |
| 4 | photographic film |
| 5 | exposure gate |
| 6 | photographic cartridge |
| 6A | take-up spool |
| 8 | assembly |
| 10 | image sensor |
| 12 | circuit board |
| 14 | cable |
| 16 | control board |
| 20A | overlapping portion |
| 30 | photographic film plane |
| 31 | cartridge receiving structure |
| 32 | control circuit |
| 33 | temporary memory |
| 34 | external memory |
| 34A | shutter mechanism |
| 34B | shutter mechanism |
| 34B | shutter mechanism |
| 36 | linear magnetic head |
| 38 | magnetic head |
| 40 | head interface electronics |
| 41 | keyboard |
| 42 | display interface electronics |
| 43 | input/output device |
| 44 | display controller |
| 20A | overlap |
| 45 | autofocus system |
| 46 | display device |
| 47 | power supply |
| 48 | microprocessor |
| 100 | timing generator |
| 102 | CCD drivers |
| 104 | address generator |
| 110 | signal processing circuitry |
| 112 | analog signal processing circuitry |
| 106 | analog-to-digital converter |
| 108 | digital-to-analog converter |
| 125 | objective lens |
| 126 | objective lens |
| 127 | objective lens |
| 128 | reflecting mirror |
| 129 | field lens |
| 130 | LCD |
| 130A | viewfinder mask |
| 131 | optical prism |
| 132 | optical prism |
| 133 | eye piece |
| 134 | eye protective glass plate |
| 135 | viewfinder |
| 143 | mode switch |
| 150 | decision block |
| 152 | block |
| 154 | block |
| 156 | block |
| 158 | block |
| 162 | block |
| 166 | block |

What is claimed is:

1. In a method of making a single panoramic image of a scene which is formed by joining different portions of the scene, comprising the steps of:

a) providing first and second image capturing means with the second image capturing means including a moveable lens;

b) moving the second lens so that it captures at least one different portion of the scene but which overlaps with a first portion of the scene captured by the first image capture means, the second image capture means including an image sensor;

c) determining when the second lens moves across the scene to a desired position;

d) stopping the second lens at the desired position for causing the first and second capture means to capture overlapping images of different portions of the scene to thereby capture a panoramic image of the scene; and e) combining the different portions of the scene into the single panoramic image by removing an overlap and joining the portions into the single image.

2. The method of claim 1 further including repeating steps b)–d) to capture a single panoramic image composed of a plurality of images which overlap with one or more portions of an adjacent image.

3. A method of making a single image of a scene which selectively can be a single image of the scene or a panoramic image which is formed by joining different portions of the scene, comprising the steps of:

a) providing first and second image capturing means with the second image capturing means including a moveable lens;

b) selectively operating in a first mode of operation for capturing a single image of the scene by the first image capture means and in a second mode of operation moving the second lens so that it captures at least one different portion of the scene but which overlap with a first portion of the scene simultaneously captured by the first image capture means, the second image capture means including an image sensor;

c) determining when the second lens moves across the scene to a desired position;

d) stopping the second lens at the desired position for causing the first and second capture means to capture overlapping images of different portions of the scene to thereby capture a panoramic image of the scene; and e) combining the overlapping images by removing an overlapping portion and joining the images into a single image.

4. The method of claim 3 further including repeating steps b)–d) in the second mode of operation to capture a single panoramic image composed of a plurality of images which overlap with one or more portions of an adjacent image.

5. A camera system for capturing a scene which includes at least two different portions on a photographic film and a CCD image sensor to capture a panoramic image of the scene, respectively, comprising:

first image capture means including a first lens for focusing an image of a portion of the scene on the photographic film;

second image capture means including a second lens for focusing an image of at least one other portion of the scene onto the CCD image sensor with this other portion overlapping in part with the portion of the scene captured by the first image capture means;

a movable assembly for positioning the second lens so that it captures different positions of the scene on the image sensor;

a viewfinder for permitting a camera user to view the scene as the second lens is moved to different positions and for permitting a user to determine a desired position of the second camera lens;

the movable assembly for positioning the second lens at the desired position and causing the first and second capture means to capture overlapping images of different portions of the scene to thereby capture a panoramic image of such scene.

\* \* \* \* \*